PULSE FREQUENCY DIVISION NETWORK FOR CALIBRATION OF RADIOSONDE RECEPTORS

Filed Aug. 5, 1955 4 Sheets-Sheet 1

INVENTOR.
RALPH HERBERT SHAW
BY Wade Koontz and Donald C. Keaveney
ATTORNEYS

Oct. 8, 1957 R. H. SHAW 2,809,292

PULSE FREQUENCY DIVISION NETWORK FOR CALIBRATION OF RADIOSONDE RECEPTORS

Filed Aug. 5, 1955 4 Sheets-Sheet 2

INVENTOR.
RALPH HERBERT SHAW
BY Wade Koontz and Donald C Keaveney
ATTORNEYS

Oct. 8, 1957

R. H. SHAW

PULSE FREQUENCY DIVISION NETWORK FOR CALIBRATION OF RADIOSONDE RECEPTORS 2,809,292

Filed Aug. 5, 1955

4 Sheets-Sheet 3

INVENTOR.
RALPH HERBERT SHAW
BY Wade Koontz and Donald C Keaveney
ATTORNEYS

INVENTOR.
RALPH HERBERT SHAW
BY Wade Koontz and
Donald C Keaveney
ATTORNEYS

United States Patent Office 2,809,292

Patented Oct. 8, 1957

2,809,292

PULSE FREQUENCY DIVISION NETWORK FOR CALIBRATION OF RADIOSONDE RECEPTORS

Ralph Herbert Shaw, Rantoul, Ill.

Application August 5, 1955, Serial No. 526,793

6 Claims. (Cl. 250—27)

(Granted under Title 35, U. S. Code (1952), sec. 266)

The invention described herein may be manufactured and used by or for the United States Government for governmental purposes without payment to me of any royalty thereon.

This invention relates to a pulse frequency division network employing thyratron tubes in a plurality of ring counter circuits the arrangement of which is switch selectable to obtain a plurality of overall network division ratios. The invention is particularly intended for use as a calibration frequency standard for radiosonde receptors, but both the particular thyratron ring counter circuit and the network arrangement of the circuits are obviously capable of application to many other uses.

All radiosonde data is directly dependent upon a radiosonde receptor which has been accurately calibrated with a frequency standard. Until so calibrated the radiosonde receptor is incapable of providing data from upper air soundings.

At the time of the invention the conventional frequency standard which was available had proved to be inaccurate and undependable in field service. The heretofore known equipment generally uses three tuning forks which are undoubtedly very accurate in generating their designed fundamental frequencies of 100, 720, and 760 cycles per second. But it has been proved unsound to attempt to control with these forks the frequency of a multivibrator which is resistance-capacitance tuned to a selected submultiple of the forks as is done in heretofore known equipment. An R–C tuned multivibrator, oscillating at the very low frequencies of from 10 to 190 cycles per second used in radiosondes, is extremely critical in its dependence upon the precise values of the resistors and capacitors. Nominal temperature and humidity variations, as well as simply aging of these circuit components, vary the period of the oscillator from the intended submultiple of the fork. The fork is then no longer able to control or trigger the multivibrator at the submultiple frequency. The multivibrator becomes free running at some off frequency, or is erratically triggered by the fork to produce a varying frequency.

It is an object of this invention to utilize the known accuracy of the tuning forks, but to produce the desired submultiple frequencies by a circuit which relies upon the precision of firing time and the large and precise swings of plate voltage of thyratron tubes and does not depend upon critical R–C constants.

It is a further object of this invention to actually divide the fork frequencies by selected combinations of electronic scaling or counting ring circuits employing thyratrons.

It is a further object of this invention to provide such circuitry which is adapted to such uses as a frequency standard for radiosonde receptors, a counter for digital computers or of quantity or frequency of any energy constituted pulse or waveform, electronic signal producing test equipment, music producing instruments, pulse modulation or gating for communications frequency channel switching, or any application requiring an accurate and stable low frequency standard.

These objects are achieved by providing a plurality of individual ring counter circuits each of which has a number of stages equal to the desired frequency division ratio of the ring circuit. Each stage comprises a thyratron tube and an associated gated cathode follower buffer amplifier. A plural position multiwafer switch is wired to give various desired combinations of the ring circuits so as to obtain desired overall network frequency division or count down ratios using a minimum number of ring counters and leading to a very flexible system. In developing the individual ring counter or scaler circuits the gas thyratron tube was selected for its unique self-locking characteristic. The tube, once fired by a positive input signal on its grid remains conductive until a controlled reset negative-going pulse is applied to its plate. The cathode of each gated cathode follower is coupled to the grid of the succeeding thyratron to supply the positive input signal to fire it and the plate of that thyratron is coupled back to the preceding thyratron to supply the negative-going reset pulse for it. Each input pulse moves conduction one stage and if an output is taken from the thyratron of only one stage the frequency of the output will be that of the input pulse divided by the number of stages. Thus one thyratron is used to gate the cathode of a buffer triode through which the input signal is fed to the following stage. Furthermore, the swing of the plate of the thyratron can easily be of the order of two hundred volts rendering wide margin between amplitude of input signal and cathode bias of the input gated buffer to the following thyratron thus further rendering the circuit noncritical in operation.

Other objects and advantages will be apparent to those skilled in the art from the following detailed description taken in conjunction with the accompanying drawings forming a part thereof wherein.

Figure 1:
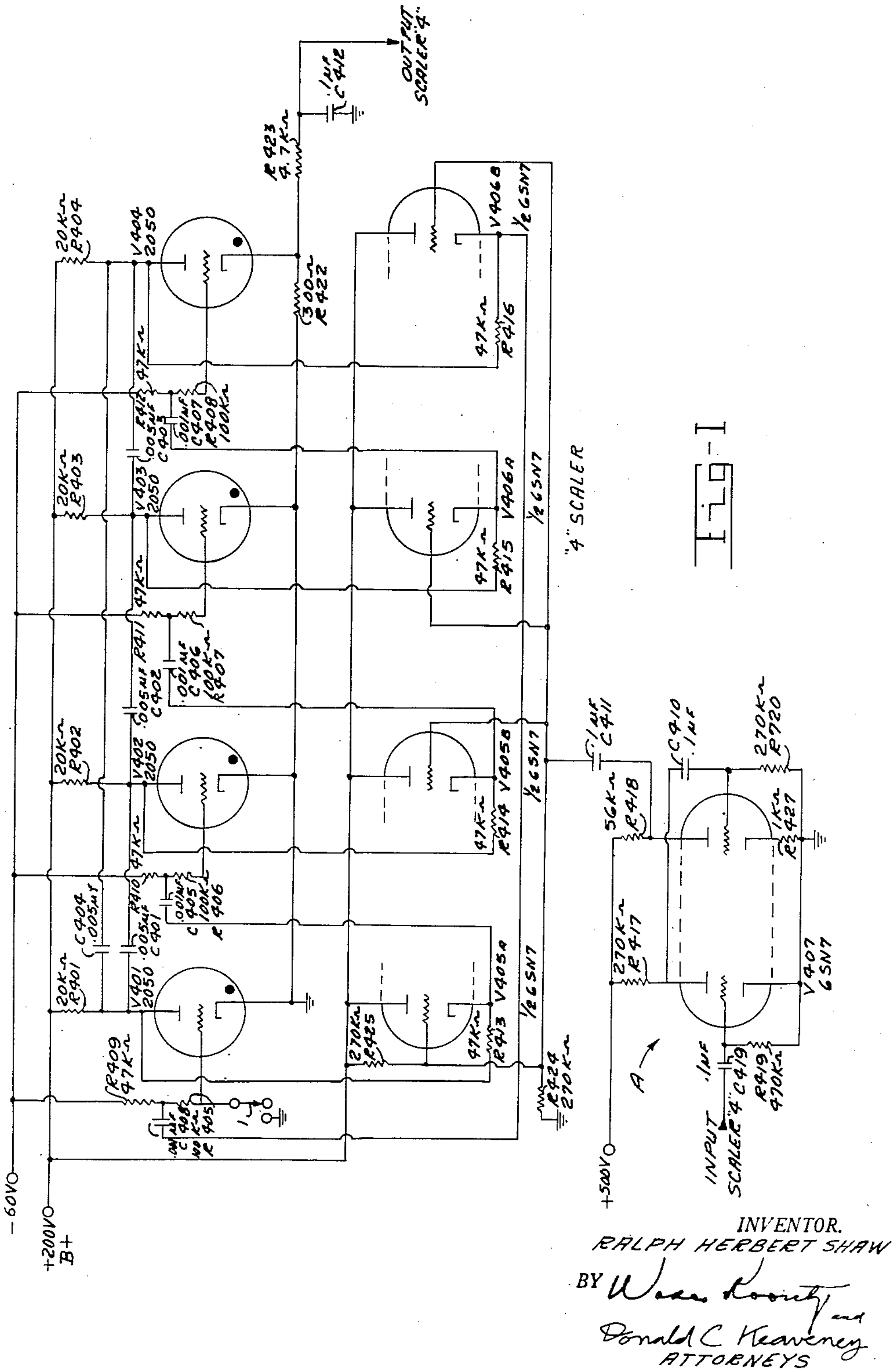
Figure 1 is a circuit diagram of an individual thyratron ring counter circuit having a count down or frequency division ratio of one to four.

Referring now to Figure 1, the circuit shown will be hereinafter called a "4" scaler since it has a count down ratio of one to four. The signal input to scaler "4" is first passed through a conventional cascaded twin triode voltage amplifier indicated generally at A. Input is fed to the grid of V407 which may be a 6SN7 tube the plates of which are supplied from a 500 volt source. Large coupling capacitors C419 and C410 are used. Since the first section cathode is grounded, grid leak bias R419 and a large plate-load resistance R417 are necessary to avoid abuse of the tube. A much smaller plate load resistor R413 is used in the second stage to effect a reasonable impedance match with the following load. The 1K unbypassed cathode resistor R427 is used to avoid too great an abuse of this section of the tube. More stages could of course be used instead of driving the tube to the extent shown in Figure 1. The output of amplifier A is coupled by capacitor C411 to the parallel connected grids of the gated sections of the two 6SN7 tubes V405 and V406 which are connected as cathode follower buffer amplifiers.

Associated with each of these gated sections is a type 2050 thyratron shown at V401, V402, V403, and V404. Visualizing each of the thyratrons to be deionized, it will be seen that the cathodes of V405 and V406 will be held at the B+ supply voltage since these cathodes are each connected through their cathode load resistors, R413, R414, R415, and R416, to the plate of the associated thyratron and all of these plates are in turn connected in parallel to B+ through load resistors R401, R402, R403, and R404. Since the plates of V405 and V406 are connected directly to the same power source, no voltage difference will exist across these tubes, and hence a signal applied to their grids will not appear at the cathode through the usual cathode follower action. Cut-off action is further assured by reason of the fact that the cathodes of V405 and V406 are at approximately 200 volts while the grid bias voltage is but plus 100 volts. This grid bias is obtained from the voltage divider action of R424 and R425 connected in series between B+ and ground with the grids connected to their midpoint.

If the negative bias, minus 60 volts, on the grid of the thyratron tube V401 is momentarily removed by mechanically shorting its grid momentarily to ground through switch 1, the tube will ionize. It will remain ionized until the plate supply voltage is removed or, what amounts to the same thing, until a large negative-going pulse is applied directly to the plate of this tube. Since before ionization the plate of the tube was at plus 200 volts, the plate will swing downward upon ionization, a full 184 volts to remain at plus 16 volts so long as the tube remains ionized. The plate of V401 is connected through resistor R413 to the cathode of V405*a*; hence the cathode of the latter tube is also driven downward from plus 200 volts to a point where the tube begins to conduct very heavily owing to the plus 100 volts on its grid. Voltage drop across R413 resulting from the conduction of V405*a* prevents the cathode from dropping the full 184 volts; instead the cathode will come to rest at approximately plus 60 volts.

Now that V405*a* is in the conductive state, the signal applied to its grid will appear at its cathode as a result of cathode follower action. The full signal appearing at the cathode is developed across R413, for the plate of V401 will not change but will hold constant at plus 16 volts. This cathode signal is coupled by capacitor C405 through buffer resistor R406 to the grid of V402. The positive-going signal thus applied to the grid of V402 will raise it to a point where this thyratron will ionize. The plate of V402 will drop almost instantly (about one microsecond) the full 184 volts to a plus 16 volts. Before V402 ionized, capacitor C401 possessed the full charge of 184 volts since the plate of V401 was at plus 16 volts while that of V402 was at plus 200 volts. With the almost instantaneous 184 volt negative-going swing of the plate of V402, the large negative-going pulse is coupled by capacitor C401 to the plate of V401. With its plate driven negative V401 deionizes with a deionization time of about five microseconds. Since both C401 and R401 are small, C401 discharges rapidly allowing the plate of V401 to return to plus 200 volts. This swing of the plate of V401 carries the cathode of V405*a* with it and V405*a* is then nonconductive or cut-off and will not pass another signal to the grid of V402 until V401 is again ionized.

With the ionization of V402, V405*b* becomes conductive in ample time to develop at its cathode the next cycle of positive-going input signal, coupling the signal through C406 to the grid of V403. With application of this signal to its grid V403 ionizes, renders V406*a* conductive, and deionizes V402. V405*b* is then rendered nonconductive in the same manner as was V405*a*. The third positive-going signal cycle is then coupled through the now conductive V406*a* to the grid of V404 causing V404 to be ionized, which in turn causes V403 to deionize and to render V406*a* nonconductive.

With the ionization of V404, V406*b* becomes conductive. The fourth positive-going signal cycle, developed at its cathode, is coupled back to the grid of V401 by C408, causing V401 to ionize. The negative-going swing of the plate of V401 is coupled by C404 to deionize V404. This, of course, is back to the starting point where V405*a* is conductive to develop a positive signal pulse at its cathode. The entire process is then repeated. The next positive signal pulse passes through the gated tube to fire the next thyratron. The firing of this next thyratron gates the following vacuum triode to pass the next signal pulse, simultaneously deionizing the preceding thyratron, etc. The process is continuous until the signal is removed or power is cut off. If the signal is removed, the last thyratron to be ionized will remain so until plate voltage or all power is removed.

Figure 3:
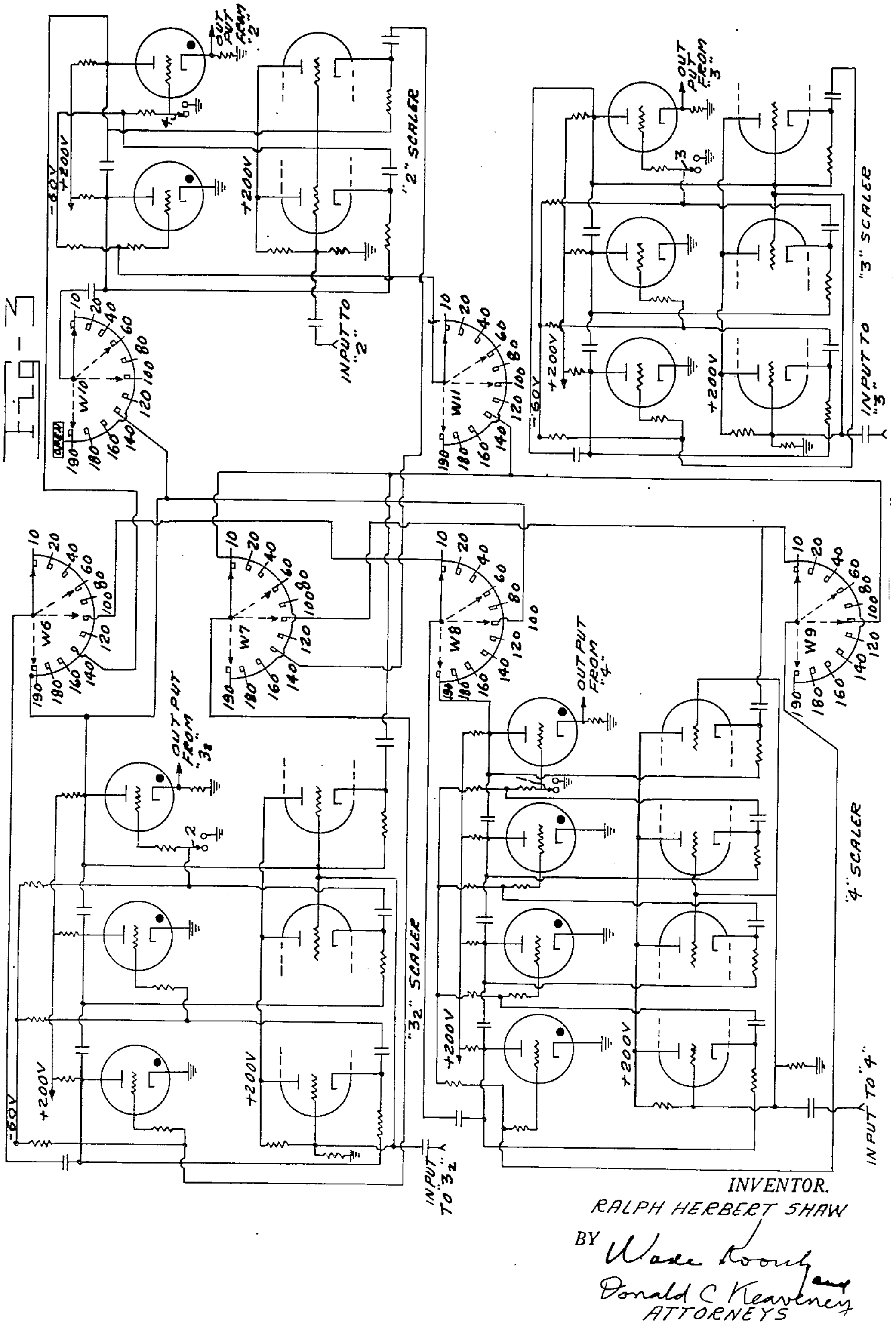
Figure 3 is a circuit diagram of that portion of Figure 2 shown within the dashed line block.
Figure 4:
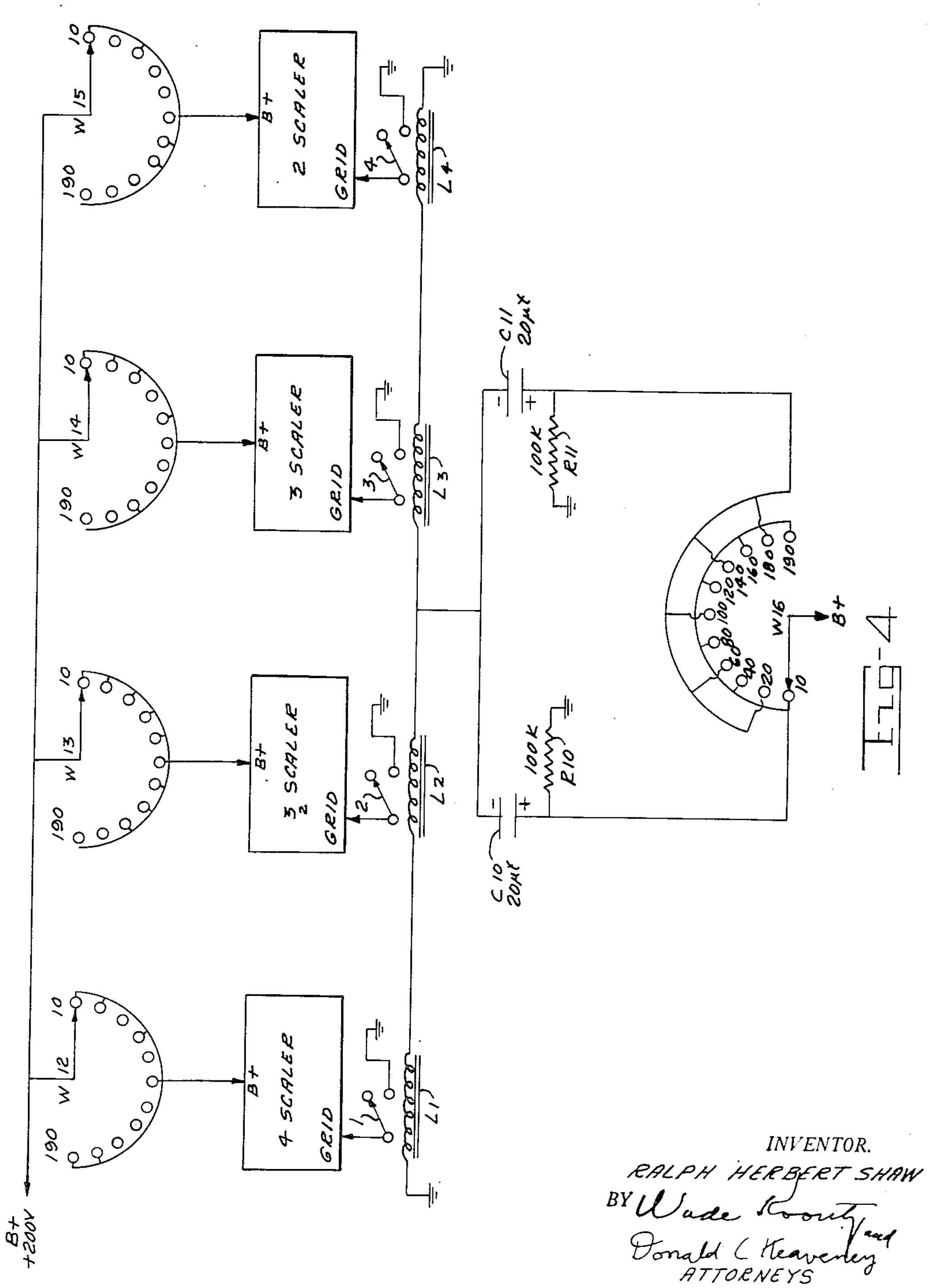
Figure 4 is a block and circuit diagram showing a means for applying plate power and starting pulses to the individual scalers of Figures 2 and 3.

It is desirable to obtain an output from the scaler which does not reflect the deionization pulses of all the thyratrons. For example, an output taken from the cathode of a gated tube or from the plate of a thyratron will reflect all such pulses. Despite the appearance of the secondary pulses from other stages on its plate, however, each thyratron actually conducts current only when ionized. Therefore output is taken from one of the thyratrons across a small unbypassed cathode resistor such as R422 connected between the cathode of V404 and ground. If the cathode resistor is kept reasonably small, it has no detectably effect on the operation of the thyratron. Even across this small load resistor sufficient signal is developed to permit filtering across a 4.7K resistor R423 and a .1 mf. capacitor C412. A smooth positive-going pulse is obtained by taking the output at this capacitor. This pulse may be passed through such further amplification and/or filtering as is necessary for any application. If, as shown for purposes of discussion, the starting signal is applied to V401 and output taken from V404, the circuit will not perform an exact division by four until after the first three pulses. This is, however, a minor point which can be easily corrected by applying a starting signal to the same tube from which output is taken. Figures 3 and 4, to be described in detail below, show an automatic means for doing exactly this. In the circuit of Figures 3 and 4 the output will contain one starting pulse and will immediately thereafter perform an exact division by a factor equal to the number of stages in the ring.

The circuit of Figure 1 has many unique advantages including the following:

(1) The precision of firing time of the thyratron tube as well as the large and precise swing of its plate.

(2) The fact that the gas tube is practically insensitive to reasonable variations or pulses on its plate (random or otherwise), either when ionized or when de-ionized. For example, when one of the gas tubes is ionized, the input signal on the other tube which the thyratron gates causes a positive pulse to be applied to its plate. In effect, the plate load resistor of the thyratron is momentarily reduced. However, the thyratron is capable of conducting many times the amount of current which is imposed through it in this circuit, and yet show no sign of change in voltage drop across the tube. Hence, the sudden positive pulse on its plate effects operation of the tube not at all. In this circuit it would be impossible to apply any negative-going pulse through the gated tube which could cause the thyratron to de-ionize.

(3) It is considered very advantageous that a single input pulse cannot possibly cause more than one (1) thyratron to fire. To illustrate, assume that an input pulse has just caused V402 to fire. If the leading edge of the signal had caused this action, it is conceivable that the cathode of V405*b* can be brought down to a point where V405*b* becomes conductive while the same input signal which caused the action still remains on the grids of the gated tubes. However, this pulse cannot cause V403 to fire, for at most the signal on the grid of V405*b* can only retard the downward swing of the cathode of that tube. The cathode will just "ride down with the negative-going half cycle of the signal. The point is that the remaining positive signal on its grid cannot possibly produce a positive-going signal on the cathode of **V405*b***. After this cathode has reached its full descent it will of course produce a positive-going pulse (as desired) as a result of the next positive-going signal cycle.

(4) Resistor and capacitor values are not critical. Although there are certainly optimum values which are shown in Figure 1, practically all these parameters can be varied one-hundred percent larger or smaller without appreciable effect upon circuit operation.

(5) The relative simplicity of the circuit cannot be overlooked as an advantage.

The upper frequency limit of the input signal which can be handled is set by the deionization time of the thyratron used and by the time constants of coupling condensers such as C405 and deionizing condensers such as C401. C405 is kept extremely small to reduce its time constant. The impedance presented by C405 as it exists in this short time-constant circuit, creates a demand for a high amplitude input signal. This is the reason why input signal amplifier A is used and driven to its full extent. It is apparent that the provisions of this amplification permits C405 etc. to be small as is necessary to provide an adequate tolerance for variations in this parameter which may be encountered under the most severe field conditions. Within wide limits, the accuracy of the circuit will not be affected by such variations. With input signals of 700 to 760 cycles per second, the values shown for these parameters in Figure 1 may vary by at least as much as plus or minus one-hundred percent without affecting the operation of the circuit. Such variation is obviously not possible, where R–C circuits are used to tune a multivibrator.

It is apparent that scalers could be constructed with any desired number of stages and hence any desired division ratio. A "3" scaler is obtained by the simple omission of one thyratron, one-gated vacuum tube section, and their associated components. A "2" scaler follows the same pattern except that only one deionizing capacitor need be connected between the plates of its two thyratrons since one capacitor can couple a deionizing pulse to either of the two thyratrons. In the larger scalers the second thyratron must deionize the first, the third must deionize the second, etc. and the first must deionize the last. This is not necessary for the "2" scaler. Such "3" and "2" scalers are shown in Figure 3 which will be fully described in detail below.

It should, however, be noted here that in Figure 3 the "3" and the "$3_2$" scalers are the same except that the "$3_2$" scaler has certain points of its circuit taken to a wafer of a selector switch for a purpose which will be described below. Both the "3" and the "$3_2$" scalers, however, have a frequency division ratio of one to three.

Figure 2:
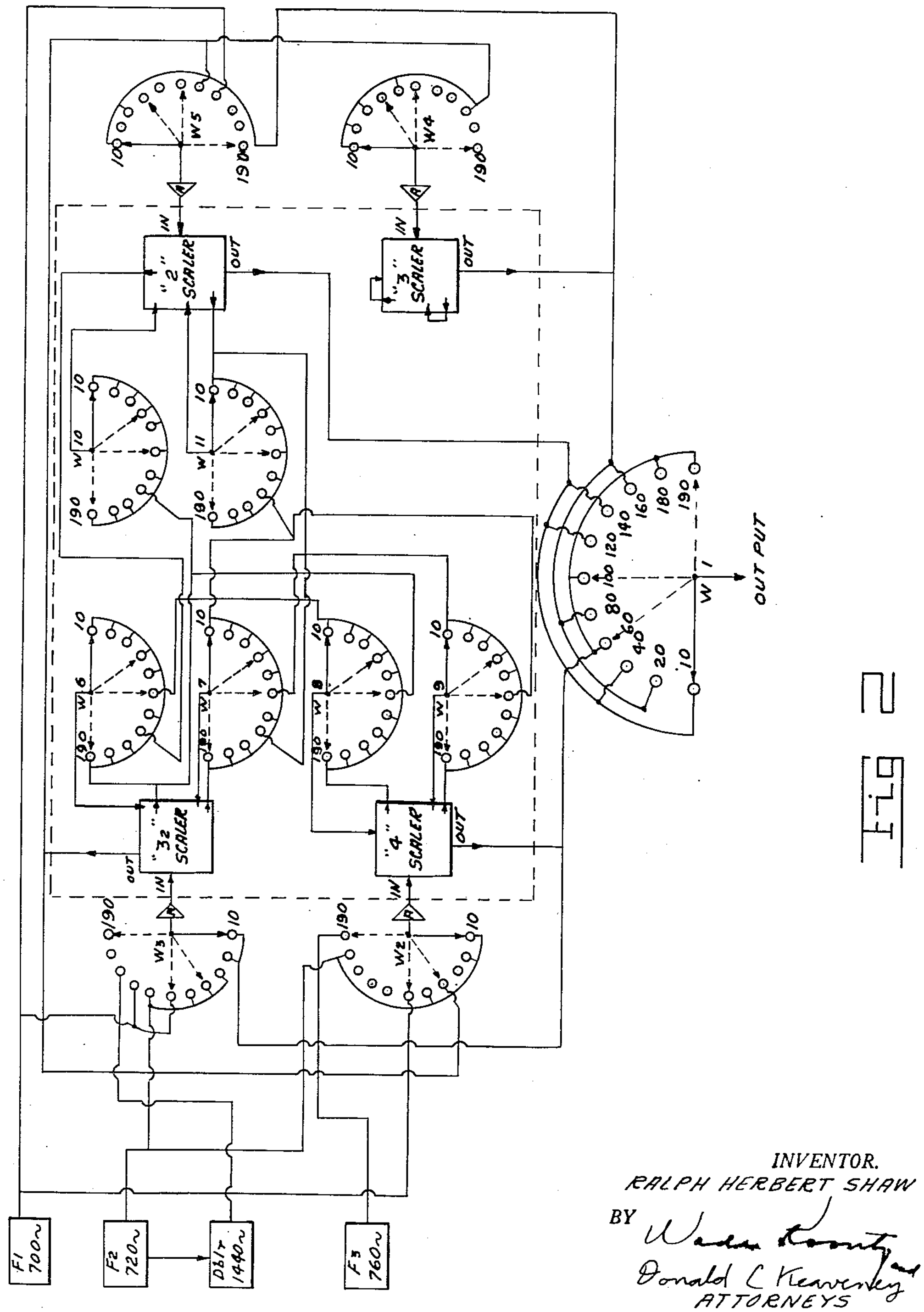
Figure 2 is a block and circuit diagram showing the wiring of the input, output, and ring enlarging wafers of a multiwafer switch used to connect a plurality of ring circuits of the type shown in Figure 1 in a frequency division network.

Referring now to Figures 2 and 3, there is shown a network consisting of sources of input signal, wafers of a ganged multiwafer plural position switch, and four scaler circuits, "4," "$3_2$," "3" and "2" of the type shown in Figure 1. This network is designed for specific application as a frequency calibration standard for radiosonde receptors, but it is obvious that the principles embodied therein may be applied with obvious variations to many other devices. In the radiosonde application presented by way of example, it is desired to utilize three standard driven tuning forks $F_1$, $F_2$, and $F_3$ having signal frequencies of 700, 720 and 760 cycles per second respectively and a frequency doubler to which the output of $F_2$ is connected to give a doubler output of 1440 cycles per second. From these four sources of input signal shown in Figure 2 it is desired to produce an output signal at W1 having a switch selected frequency of 10, 20, 40, 60, 80, 100, 120, 140, 160, 180 or 190 cycles per second. The necessary relations between signal input generator, division factor, and order of scalers used for any one of the desired output frequencies is shown in Table I.

*Table I*

| Frequency | Generator and Factor | Order of Scalers Used | Final Output Scaler, W1 | Input to Scalers "4" W2 | "$3_2$" W3 | "3" W4 | "2" W5 |
|---|---|---|---|---|---|---|---|
| 190 | 760/4 | 4 | 4 | $F_3$ | ------ | ------ | ------ |
| 180 | 720/4 | 4 | 4 | $F_2$ | ------ | ------ | ------ |
| 160 | 1440/9 | $3_2 \times 3$ | 3 | ------ | DBLR | $3_2$ | ------ |
| 140 | 700/5 | $3_2$ plus 2 | 2 | ------ | $F_1$ | ------ | $F_1$ |
| 120 | 720/6 | $3_2 \times 2$ | 2 | ------ | $F_2$ | ------ | $3_2$ |
| 100 | 700/7 | $3_2$ plus 4 | 4 | $F_1$ | $F_1$ | ------ | ------ |
| 80 | 720/9 | $3_2 \times 3$ | 3 | ------ | $F_2$ | $3_2$ | ------ |
| 60 | 720/12 | $3_2 \times 4$ | 4 | $3_2$ | $F_2$ | ------ | ------ |
| 40 | 720/18 | $3_2 \times 3 \times 2$ | 2 | ------ | $F_2$ | $3_2$ | 3 |
| 20 | 720/36 | $4 \times 3_2 \times 3$ | 3 | $F_2$ | 4 | $3_2$ | ------ |
| 10 | 720/72 | $4 \times 3_2 \times 3 \times 2$ | 2 | $F_2$ | 4 | $3_2$ | 3 |

$F_1$=700 $F_3$=760
$F_2$=720 DBLR=1440
Scaler Input Sources
And
Final Output Scalers Each of the eleven wafers shown in Figure 2, W1 through W11 is a part of the same ganged multiwafer switch. Each wafer has one terminal or arm position for each desired output frequency so that when the arm of W1 is manually moved to a position corresponding to the frequency desired to be selected the complete circuit shown to be necessary by Table I is automatically connected to the tongue of W1 at which the desired output frequency will appear.

The use of this type of switching permits a substantial reduction in the amount, cost, and weight of equipment necessary to produce the eleven desired frequencies over what would be required if separate scalers were used for each necessary division factor. Thus, it will be noted that division by factors of 4, 5, 6, 7, 9, 12, 18, 36, and 72 is performed by only four individual scalers having division factors of 4, 3, 3, and 2. Furthermore, from Figure 2 it will be obvious that many more combinations of these four scalers could have been obtained.

Three basic types of switch-controlled connection of scalers are used, namely, (1) one ring circuit only, (2) ring circuits in tandem so that division ratios multiply and (3) ring circuits having their stages combined so that division ratios add. If even greater flexibility is desired it is obvious that types (2) and (3) could be combined. Thus division by 20 would be accomplished by a "4" scaler in tandem with a "3" and "2" combined. The three basic types are illustrated by the settings having output frequencies of 190, 60, and 100 cycles per second respectively. The switch arms of all wafers are shown in solid lines set to an output frequency of 10 cycles per second (which is the same tandem type of connection used for 60 cycles but using more rings) and settings are indicated in dashed lines for 190, 60, and 100 cycles. The circuit operation for each of these four settings will be traced.

Referring now to Figures 2 and 3, if W1 is set to the 190 output position the switch arms on all other wafers will also be set to the 190 position. It will be noted that in this position W3, W4, and W5 terminate on open connections so that there is no input signal to the "$3_2$," "3,"

or "2" scalers. W2, however, makes connection with the 760 cycle signal from $F_3$ and feeds it to input amplifier A of the "4" scaler. Output from the "4" scaler is connected to the 190 position on W1 where it is picked off by the switch arm. The other terminals to which "4" output is connected are, of course, open in this position. The function of wafers W6 through W11 can best be seen in Figure 3 which is a circuit diagram of that portion of Figure 2 within the dashed block. It will be noted that in the 190 position, W6 and W8 couple the plate of the last thyratron of the "$3_2$" and "4" scalers respectively back to the plate of their first thyratron, whereas W7 and W9 couple signal from the cathode of the last cathode follower to the grid of the first thyratron so that both the "$3_2$" and the "4" scaler are operating as separate individual rings of the type discussed in Figure 1. "$3_2$," of course, has no input, but the output from "4" will be 760 divided by 4 or the desired 190 cycles per second. W10 is the signal coupling wafer for the "2" scaler but it will be noted that the bus bar on W10 is open since the "2" scaler needs only one deionizing capacitor as noted above when it is operated as an individual stage. Wafer W10 functions only in the 140 position which is similar to the 100 setting to be discussed below. The "3" scaler has only the input wafer shown in Figure 2 since in this particular application it is always operated as an individual ring. Of course, if it were desired to combine it with other scalers in the type of setting to be discussed for 100 and 140, wafers similar to W6 and W7 could also be provided for it.

Hence it is seen that in the first type of setting where an input signal is to be divided merely by the division ratio of one individual ring circuit only the input wafers W2 through W5 are actually needed. The combining wafers W6 through W11 are in what we may term the inoperative position since they merely complete the individual ring circuits in the normal fashion described for Figure 1. This is also true for the second type of setting illustrated by output frequencies of 60 or 10 cycles per second. The difference is that in this second type of setting more than one input wafer is used, but again all combining wafers are in the inoperative position.

This may be seen by considering the setting for 60 cycles. Here 720 cycle signal from $F_2$ is picked up by the arm of W3 and fed as input to the "$3_2$" scaler which operates as an individual stage with a division ratio of one to three. Output from this stage is picked up by the switch arm of W2 and fed as an input to scaler "4." The other connections of "$3_2$" output end on open terminals in the 60 position of the ganged wafer arms. The "4" scaler again divides the "$3_2$" output so that the 720 cycle input signal is divided by twelve, that is, by the product of the division ratios of the two individual ring circuits. The 10 cycle setting is of the same type but here for convenience the 720 cycle signal is first fed to the "4" scaler the output of which is fed to "$3_2$" thence to "3" thence to "2" and finally to output wafer W1. This tandem connection of all four rings gives a total division ratio of 72 so that 10 cycle output is obtained from the 720 cycle input. Again the combining wafers are so connected that each stage operates as an individual unit, that is, these wafers are inoperative insofar as combining stages is concerned.

The third type of setting in which the stages of individual ring circuits are combined to form enlarged ring circuits having a division ratio which is the sum rather than the product of the division ratios of the individual rings is illustrated by the settings for 100 and 140 cycle output. Consider first the 100 setting, 700 cycle input from $F_1$ is applied to both the "$3_2$" and "4" scalers through wafers W3 and W2 respectively, whereas output is taken only from the "4" scaler as may be seen in Figure 2. Turning to Figure 3 it will be noted that in the 100 setting W9 couples the cathode of the last cathode follower of "$3_2$" to the grid of the first thyratron of "4" and similarly W7 couples the cathode of the last cathode follower of "4" to the grid of the first thyratron of "$3_2$"; furthermore W8 couples the plate of the last thyratron of "$3_2$" to the plate of the first thyratron of "4" and similarly W6 couples the plate of the last thyratron of "4" to the plate of the first thyratron of "$3_2$" so that the signal coupling and deionizing action described in connection with Figure 1 now occurs through a continuous ring of 7 stages. By taking output from only one of these stages, here the last stage of the "4" ring, a frequency division ratio is obtained which is the sum of the individual ratios of the combined stages. It is obvious that by suitable wiring of the wafers more than two stages could be so combined additively or combined stages could be placed in tandem with other rings as suggested above; for example, the case of division by 20 being $4 \times (3 \text{ plus } 2)$.

The connection for 140 does not have the switch arms shown in dashed lines in order to simplify the drawing but it is understood that the switch arms can of course assume any one of the eleven positions shown. The 140 circuit is very similar to the 100 but differs in that it combines the "$3_2$" and the "2" scalers. 700 cycle input is taken from $F_1$ to both of these scalers and output is taken only from "2." Wafers W6, W7, W10 and W11 combine the rings into a single five stage ring exactly as was done in the 100 position to now give an output of 700 divided by 5 or the desired 140.

Although it is probably apparent by this time, it is desired to emphasize the flexibility of this type of counter or dividing network. The arrangements of tandem and combination circuits outlined above indicate what can be done with a relatively small amount of equipment in this type of circuit simply by switching. Thus it can be shown that using the same four ring circuits shown in the drawings, it is possible by suitable modification of the switching circuits to obtain twenty-three different network division ratios from various arrangements of the "4," "$3_2$," "3," and "2" scalers, namely division by 2, 3, 4, 5, 6, 7, 8, 9, 10, 12, 14, 15, 18, 20, 21, 24, 27, 32, 36, 42, 54, 60 and 72. Furthermore it is an obvious matter of design to choose any desired number of ring circuits having any desired number of stages in each according to the particular application one may have in mind.

Turning now to Figure 4 there is shown a circuit intended for use with the network of Figures 2 and 3 to apply plate power and a starting signal to each of the four ring counters. This circuit is intended as a part of the network of Figures 2 and 3 but is shown separately in order to simplify the drawings.

One additional wafer for each counter, W12 through W15 is used to apply B+ power to these counters only for those output frequency settings for which the particular ring counter is used. Thus in the 10 position power is supplied to all counters, but in the 190 position power is supplied only to the "4" counter. This prevents thyratrons in an unused stage from remaining ionized and consuming needless standby power.

An additional wafer W16 also has its switch arm connected to B+. Alternate pins of this wafer are connected to the positive side of one of two 20 mf. electrolytic condensers C10 and C11 as shown in Figure 4. The capacitors are bled to ground when no voltage is applied by the resistors R10 and R11. The negative sides of the capacitors are connected together so as to parallel feed to ground two series connected pairs of relay coils L1, L2, and L3, L4. It will be seen that rotation of the output selector switch W1 also rotates the switch arm of W16 and alternately applies B+ to one capacitor allowing the other to bleed to ground and then vice versa as the switch is rotated to the next selected frequency. With the sudden application of voltage to the positive terminal of one of the capacitors, a charging current passes through the two parallel circuits each consisting of the two series connected relay coils. Thus, whenever the selector switch is moved from one position to another all four of the relays are actuated. The capacitor discharges rapidly through the relay coils since the resistance of the series parallel circuit is quite low. The result is a very brief closing of the relay contacts by arms 1, 2, 3, and 4 which are normally biased to open position as shown and are connected as shown in Figures 3 and 4 to ground the grid of one thyratron in each ring circuit when momentarily closed by rotation of switch W1. The grounding of the grid applies a starting pulse to each ring circuit as described for manual operation in connection with Figure 1.

This method of automatic starting has proven very satisfactory. The action of the relays is so rapid that it is possible to pass from one frequency to another with a barely detectable audio break.

Many applications beside the design of a frequency standard are suggested by the development of these scaling circuits which will "scale" or "count" by consecutive single digits to any desired figure (dependent upon the counting capacity of each scaler and its combination with succeeding scalers for multiplying the denominator). Thus in conjunction with an automatic recording device such a network of ring counters can be used as a frequency meter to accurately measure and record the modulation frequency of a received signal. It has further obvious general application to digital computers or to counters of quantity of frequency of any energy constituted pulse or waveform. It may further be used to generate electronic signals from a stable source such as the tuning forks shown either for use in test equipment, in music producing instruments, or in pulse modulation or gating for communications frequency channel switching.

Although a preferred embodiment of the invention has been described in detail by way of illustration and various possible applications suggested, it is understood that many modifications may be made within the spirit of the invention the scope of which is defined solely by the appended claims.

What I claim is:

1. A ring counter circuit comprising, a plurality of thyratrons equal in number to the desired division ratio of the circuit, each said thyratron being grid biased to the non-conductive state, a cathode follower amplifier associated with each of said thyratrons, means connecting each of the plates of said cathode followers in parallel to a common positive voltage supply, first impedance means connected between the plate of each said thyratron and said common voltage supply, second impedance means connecting the plate of each said thyratron to the cathode of its associated cathode follower, means to render one of said thyratrons conductive and thereby gate its associated cathode follower, means to apply an input signal in parallel to the grid of each of said cathode followers, first capacitive coupling means connecting the cathode of each cathode follower to the grid of the immediately following thyratron in said ring circuit, second capacitive coupling means connecting the plate of each thyratron to the plate of the immediately preceding thyratron in said ring circuit, means connecting each of the cathodes of said thyratrons in parallel to a common ground, third impedance means in the connection between the cathode of one of said thyratrons and said common ground, and means to couple the signal across said third impedance means to an output circuit.

2. Apparatus as in claim 1 wherein the means to apply an input signal comprises a voltage amplifier the output of which is capacitively coupled in parallel to the grid of each of said cathode followers.

3. A pulse frequency division network having a plurality of selectable division ratios, said network comprising, a plurality of separate ring counter circuits each having a number of individual stages in the ring equal to the division ratio of the ring; first means to connect the output of a first ring counter circuit to the input of a second ring counter circuit whereby the overall division ratio of said first and second circuits in tandem is the product of their individual division ratios; second means to combine the stages of said first ring counter with the stages of said second ring counter in a single enlarged continuous ring counter circuit whereby the overall division ratio of the combined stages of said first and second ring counter circuit is the sum of the individual division ratios of said first and second ring counter circuits; and switch means to select a desired network division ratio, said switch means controlling said first and second means so that in one position of said switch means said first and second means are both inoperative whereby the network division ratio is the division ratio of an individual ring counter circuit, in a second position of said switch means said first means is operative and said second means is inoperative whereby the network division ratio is the product of the individual division ratios of said first and second ring counter circuits, and in a third position of said switch means said first means is inoperative and said second means is operative whereby the network division ratio is the sum of the individual division ratios of said first and second ring counter circuits.

4. Apparatus as in claim 3 wherein said switch means also controls third means to apply a starting signal to each of said ring counter circuits at each change of position of said switch means and wherein said switch means also controls fourth means to apply operating power to only those ring counter circuits used in obtaining the network division ratio to which said switch means is set.

5. Apparatus as in claim 3 wherein each of said ring counter circuits comprises; a plurality of thyratrons equal in number to the desired division ratio of the ring circuit, each said thyratron being grid biased to the non-conductive state, a cathode follower amplifier associated with each of said thyratrons, means connecting each of the plates of said cathode followers in parallel to a common positive voltage supply, first impedance means connected between the plate of each said thyratron and said common voltage supply, second impedance means connecting the plate of each said thyratron to the cathode of its associated cathode follower, means to render one of said thyratrons conductive and thereby gate its associated cathode follower, means to apply an input signal in parallel to the grid of each of said cathode followers, first capacitive coupling means connecting the cathode of each cathode follower to the grid of the immediately following thyratron in said ring circuit, second capacitive coupling means connecting the plate of each thyratron to the plate of the immediately preceding thyratron in said ring circuit, means connecting each of the cathodes of said thyratrons in parallel to a common ground, third impedance means in the connection between the cathode of one of said thyratrons and said common ground, and means to couple the signal across said third impedance means to an output circuit selected by said switch means.

6. Apparatus as in claim 5 wherein said switch means is a plural position multiwafer switch having all of its switch arms ganged and having at least one terminal position on each wafer for each selectable division ratio of said network, and wherein said first means to connect the output of a first ring counter circuit to the input of a second ring counter circuit comprises a first wafer of said multiwafer switch, said first wafer having its switch arm connected to the input terminal of said second ring counter and having one of its terminal positions connected to the output of said first ring counter; and wherein said second means to combine the stages of said first ring counter with the stages of said second ring counter comprises a second and third wafer of said multiwafer switch associated with said first ring counter circuit and a fourth and fifth wafer of said multiwafer switch associated with said second ring counter circuit, the switch arm of said second wafer connecting said first capacitive coupling means from the cathode of the last cathode follower of the first ring to the grid of the first thyratron of the first ring when said second means is inoperative and connecting said first capacitive coupling means from the cathode of the last cathode follower of the second ring to the grid of the first thyratron of the first ring when said second means is operative, the switch arm of said fourth wafer connecting said first capacitive coupling means from the cathode of the last cathode follower of the second ring to the grid of the first thyratron of the second ring when said second means is inoperative and connecting said first capacitive coupling means from the cathode of the last cathode follower of said first ring to the grid of the first thyratron of the second ring when said second means is operative, the switch arm of said third wafer connecting the plate of the last thyratron of the first ring to the second capacitive coupling means to the plate of the first thyratron of the first ring when said second means is inoperative and connecting the plate of the last thyratron of the second ring to the second capacitive coupling means to the plate of the first thyratron of the first ring when said second means is operative, the switch arm of the fifth wafer connecting the plate of the last thyratron of the second ring to the second capacitive coupling means to the plate of the first thyratron of the second ring when said second means is inoperative and connecting the plate of the last thyratron of the first ring to the second capacitive coupling means to the plate of the first thyratron of the second ring when said second means is operative.

References Cited in the file of this patent

UNITED STATES PATENTS

| | | |
|---|---|---|
| 2,099,065 | Holden | Nov. 16, 1937 |
| 2,401,657 | Mumma | June 4, 1946 |
| 2,457,819 | Hoeppner | Jan. 4, 1949 |
| 2,516,146 | Prugh | July 25, 1950 |